United States Patent
Charny et al.

(10) Patent No.: US 8,179,902 B2
(45) Date of Patent: May 15, 2012

(54) METHOD AND SYSTEM FOR AUTOMATIC GENERATION OF ROUTE DISTINGUISHERS FOR VIRTUAL PRIVATE NETWORKS

(75) Inventors: Anna Charny, Sudbury, MA (US); Mohammed Sayeed, Shrewsbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 1095 days.

(21) Appl. No.: 11/182,700

(22) Filed: Jul. 15, 2005

(65) Prior Publication Data
US 2007/0025377 A1    Feb. 1, 2007

(51) Int. Cl.
*H04L 12/28* (2006.01)

(52) U.S. Cl. ............... 370/397; 370/395.53; 370/409

(58) Field of Classification Search ............... 370/456.2, 370/456.3, 456.4, 456.5, 456.6, 457, 404.2
See application file for complete search history.

(56) References Cited

U.S. PATENT DOCUMENTS

| | | | | |
|---|---|---|---|---|
| 5,280,476 | A * | 1/1994 | Kojima et al. ............... | 370/397 |
| 6,035,105 | A * | 3/2000 | McCloghrie et al. ......... | 709/236 |
| 6,560,236 | B1 * | 5/2003 | Varghese et al. ............. | 370/401 |
| 6,957,067 | B1 * | 10/2005 | Iyer et al. .................... | 455/435.1 |
| 7,471,631 | B2 * | 12/2008 | Kang et al. ................... | 370/235 |
| 2002/0156875 | A1 * | 10/2002 | Pabla ........................... | 709/220 |
| 2002/0191541 | A1 * | 12/2002 | Buchanan et al. ............ | 370/230 |
| 2003/0021222 | A1 * | 1/2003 | Boer et al. .................... | 370/216 |
| 2003/0112799 | A1 * | 6/2003 | Chandra et al. ............... | 370/389 |
| 2004/0059831 | A1 * | 3/2004 | Chu et al. ...................... | 709/242 |
| 2004/0215693 | A1 * | 10/2004 | Thompson .................... | 709/201 |
| 2004/0223500 | A1 * | 11/2004 | Sanderson et al. ........ | 370/395.53 |
| 2005/0091482 | A1 * | 4/2005 | Gray et al. .................... | 713/151 |
| 2005/0129023 | A1 * | 6/2005 | Jagannathan et al. ........ | 370/392 |
| 2005/0271047 | A1 * | 12/2005 | Huonder et al. .............. | 370/389 |
| 2006/0072589 | A1 * | 4/2006 | Mandavilli et al. .......... | 370/400 |
| 2006/0184998 | A1 * | 8/2006 | Smith et al. ...................... | 726/3 |
| 2006/0215578 | A1 * | 9/2006 | Andrapalliyal et al. ...... | 370/254 |
| 2006/0236095 | A1 * | 10/2006 | Smith et al. ................... | 713/153 |
| 2007/0168560 | A1 * | 7/2007 | Alkire .......................... | 709/247 |
| 2007/0223486 | A1 * | 9/2007 | Farid et al. ................. | 370/395.2 |
| 2008/0172732 | A1 * | 7/2008 | Li et al. ........................... | 726/15 |

OTHER PUBLICATIONS

Rosen E. and Y. Rekhter, RFC 2547: BGP/MPLS VPNs. IETF, Mar. 1999.*
E. Rosen et al., "RFC 2547—BGP/MPLS VPNs", IETF, Mar. 1999.

* cited by examiner

*Primary Examiner* — Nittaya Juntima
*Assistant Examiner* — Andrew Oh
(74) *Attorney, Agent, or Firm* — Cindy Kaplan

(57) ABSTRACT

A method and system for automatically generating a route distinguisher for a virtual private network are disclosed. The method includes receiving a virtual private network name and rejecting the virtual private network name if the name comprises a number of bytes greater than a predefined limit. If the virtual private network name is less than the predefined limit, an algorithm is applied to automatically convert the virtual private network name to a route distinguisher for the virtual private network.

20 Claims, 4 Drawing Sheets

METHOD AND SYSTEM FOR AUTOMATIC GENERATION OF ROUTE DISTINGUISHERS FOR VIRTUAL PRIVATE NETWORKS

BACKGROUND OF THE INVENTION

The present invention relates generally to data networking and, more specifically, to a method and system for automatic generation of route distinguishers for Virtual Private Networks (VPNs).

The rapid growth of the Internet and the widespread deployment of networks built around the Internet Protocol suite are creating a demand for new capabilities in IP (Internet Protocol) networks. MultiProtocol Label Switching (MPLS) provides a number of powerful capabilities such as traffic engineering, etc. MPLS is an IETF (Internet Engineering Task Force) initiative that integrates Layer 2 information about the network links (bandwidth, latency, utilization) into Layer 3 (IP) within a particular autonomous system in order to simplify and improve IP packet exchange. Service providers with an MPLS/IP backbone may provide VPNs for its customers, as described in RFC 2547 ("BGP/MPLS VPNs", E. Rosen et al., March 1999), which is incorporated herein by reference in its entirety. Virtual Private Networks serve as network overlays on IP network infrastructures.

FIG. 1 illustrates an example of a provider network in communication with two customer networks, vpnA and vpnB. The provider network includes a plurality of provider routers (P) and provider edge (PE) routers. The VPNs include customer edge (CE) routers. Each VPN is associated with one or more VPN routing/forwarding instances (VRFs), which define the VPN membership of a customer site attached to a PE router. A VRF consists of an IP routing table, a derived Cisco Express Forwarding (CEF) table, a set of interfaces that use the forwarding table, and a set of rules and routing protocol parameters that control the information that is included in the routing table. Packet forwarding is performed based on label information within the MPLS core network, as is well known by those skilled in the art.

In MPLS VPN configuration of routers, the operator needs to define a route distinguisher (RD) associated with a VPN. A route distinguisher is an address qualifier used within an internet service provider's MPLS network. The route distinguisher is assigned by the provider to a VPN and used to distinguish VPN routes of separate customers who connect to the provider. The route distinguisher is an 8 byte field prefixed to the customer's IPv4 address. The resulting 12 byte field is a unique VPN-IPv4 address. As described in RFC 2547, the 8 byte route distinguisher comprises three fields: Type Field (2 bytes), which determines the lengths of the other two fields, as well as the semantics of the administrator field; Administrator Field, which is typically the 4 byte autonomous system (AS) number of the provider; and Assigned Number Field, which is assigned by the provider. The AS number and the Assigned Number make the VPN-IPv4 address globally unique.

The route distinguisher is used by edge routers to identify which VPN a packet belongs to. Within an MPLS network, a PE router is configured to associate each route distinguisher with routes that lead to a particular CE router. The route distinguisher used to generate the VPN-IPv4 prefix is specified by a configuration command associated with the VRF on the PE router. Configuration steps performed on a router include assigning a route distinguisher, configuring import of route targets, and configuring export of route targets.

Many Enterprise customers are deploying MPLS VPNs. However, one problem is that it is necessary to simplify the configuration of MPLS VPNs on the router. Instead of having all of the information on the VRF (four lines of configuration commands), it is desired to hide the configuration complexity and instead handle this detail behind the scenes so that the configuration detail has only one line. In order for this to be done, however, the route distinguisher must be autogenerated from the VPN name.

There is, therefore, a need for a method and system for automatically generating from a VPN name, a unique route distinguisher that can be used to build full mesh VPNs with less configuration detail.

SUMMARY OF THE INVENTION

A method and system for automatically generating a route distinguisher for a virtual private network are disclosed. The method includes receiving a virtual private network name and rejecting the virtual private network name if the name comprises a number of bytes greater than a predefined limit. If the virtual private network name is less than the predefined limit, an algorithm is applied to automatically convert the virtual private network name to a route distinguisher for the virtual private network. The appropriate import and export rules are also applied.

The algorithm may be a compression algorithm, and in some embodiments, a lossless compression algorithm. The generated route distinguisher may be checked to ensure that it is not greater than a second predefined limit. If the generated route distinguisher is greater than the second predefined limit, a new virtual private network name may be requested. In order to eliminate the need to check the size of the generated route distinguisher, additional restrictions may be placed on characters used in the virtual private network name.

In another aspect of the invention, a method for creating a unique route distinguisher associated with a virtual private network and configuring the virtual private network generally comprises assigning a route distinguisher to a virtual private network and building a full mesh virtual private network. Assigning a route distinguisher to the virtual private network includes receiving user input and rejecting the user input if the input comprises a number of bytes greater than a predefined limit. If the user input is not rejected, an algorithm is applied to automatically convert the user input to a unique route distinguisher for the virtual private network.

In yet another aspect of the invention, a computer program product for automatically generating a route distinguisher for a virtual private network generally comprises: code that causes a received virtual private network name to be rejected if the name comprises a number of bytes greater than a predefined limit; code that causes an algorithm to automatically convert the virtual private network name to a route distinguisher for the virtual private network, if the virtual private network name is equal to or less than the predefined limit; and a computer-readable medium that stores the codes.

Further understanding of the nature and advantages of the inventions herein may be realized by reference to the remaining portions of the specification and the attached drawings.

DESCRIPTION OF SPECIFIC EMBODIMENTS

Figure 1:
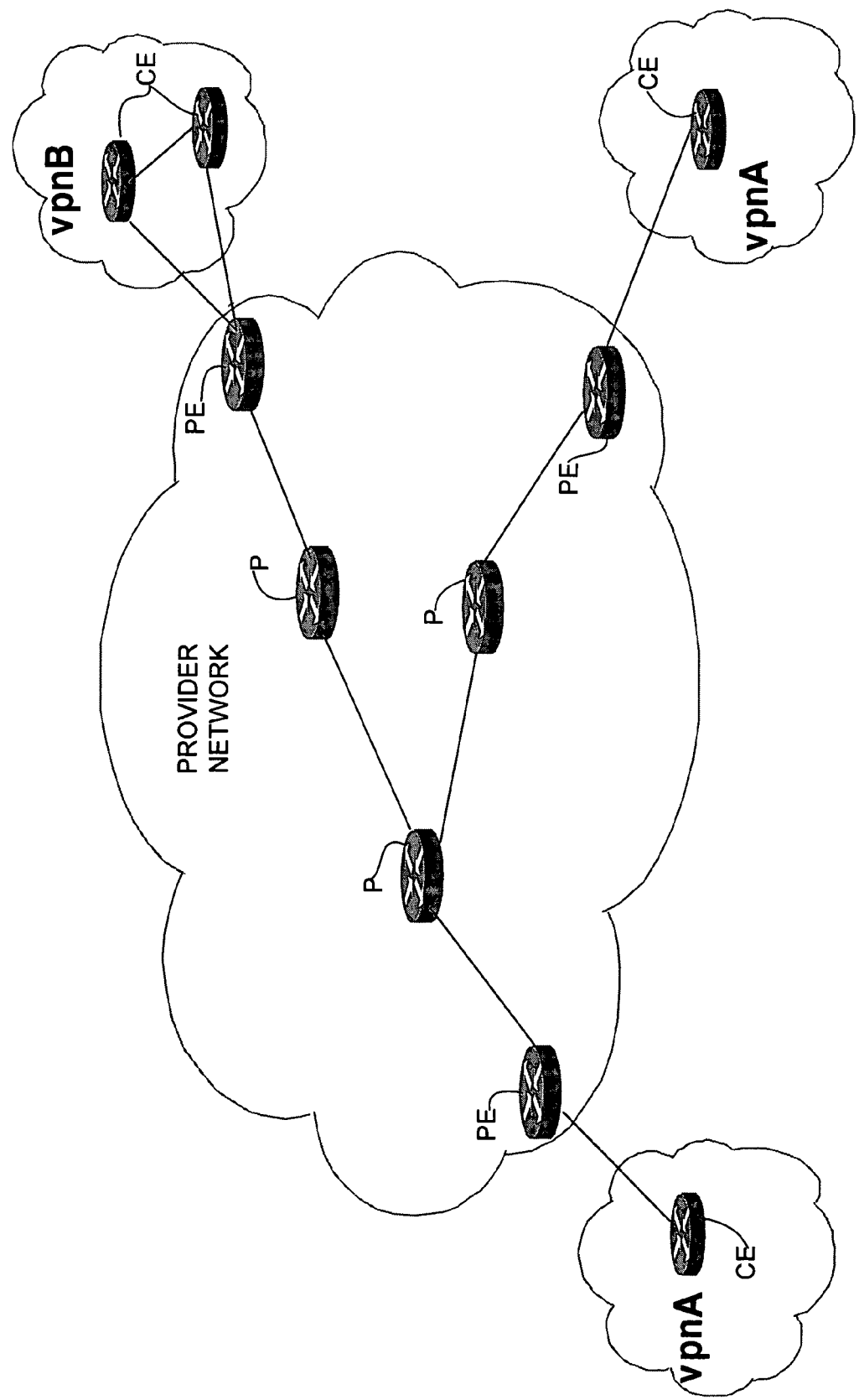
FIG. 1 depicts an example of virtual private networks with a service provider backbone.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM or ROM. However, there are many different ways in which memory could be coupled to the system. A router may be implemented on a general purpose network host machine such as a computer system, or network device described below with respect to FIG. 4.

A method and system of the present invention provide for the automatic generation of route distinguishers for VPNs. In order to simplify the configuration of MPLS VPNs, an RD is autogenerated from the VPN name, which is a character string specified by the operator. If the VPN string is compressed or converted to 6 bytes in the RD, a unique RD can be created and can be used to build full mesh VPNs with a simple one line configuration. For example, the one line configuration may be:

vrf ipv4<vpn name>fullmesh autoconfig
    where: <vpn name>is a string of characters.

The import and export statements can be automatically inserted in the background without the operator configuring this explicitly.

The following describes methods for translating a 10 byte VPN name into a 6 byte unique numeric RD identifier (leaving 2 bytes for the AS number). In a first embodiment, a method and system include the use of a lossless compression algorithm (i.e., compression that loses no data during the compression or decompression process) for generating a unique RD from the VPN name. In a second embodiment of the invention, a specific conversion/compression algorithm is used that is guaranteed to always fit into the desired 6 byte output. Both embodiments require certain restrictions on the VPN name input, as described in detail below.

In the first embodiment, a lossless compression technique is used on the ASCII VPN name user input. One example of a lossless data compression algorithm that may be used is Huffman coding, which uses a small number of bits to encode common characters. Huffman coding results in about 5/8 compression ratio. For 10 byte user input, the average compressed input results in more than 6 bytes for the desired unique identifier. The user input is therefore constrained to start with a predefined name prefix (e.g., VPNxxxxxxx), thus reducing the meaningful portion of the ASCII input to 7 or 8 bytes, for example. In this case, Huffman coding on the average fits into a 5 byte identifier after compression.

It is to be understood that Huffman coding is just one example of a lossless compression technique that may be used, and that any other compression techniques may be used without departing from the scope of the invention.

Lossless compression may occasionally result in a smaller compression ratio than the average/expected compression ratio, and in rare cases, may result in an output larger than the input string. One way of handling this problem is to simply reject user input when it cannot be properly compressed and ask for another input, assuming that eventually the compressed input will fit into the right string.

Thus, the first embodiment includes restricting the variable part of the VPN name to 7 or 8 bytes for typical compression algorithms and rejecting the input VPN name as invalid in the case where lossless compression does not result in a sufficiently small result.

Figure 2:
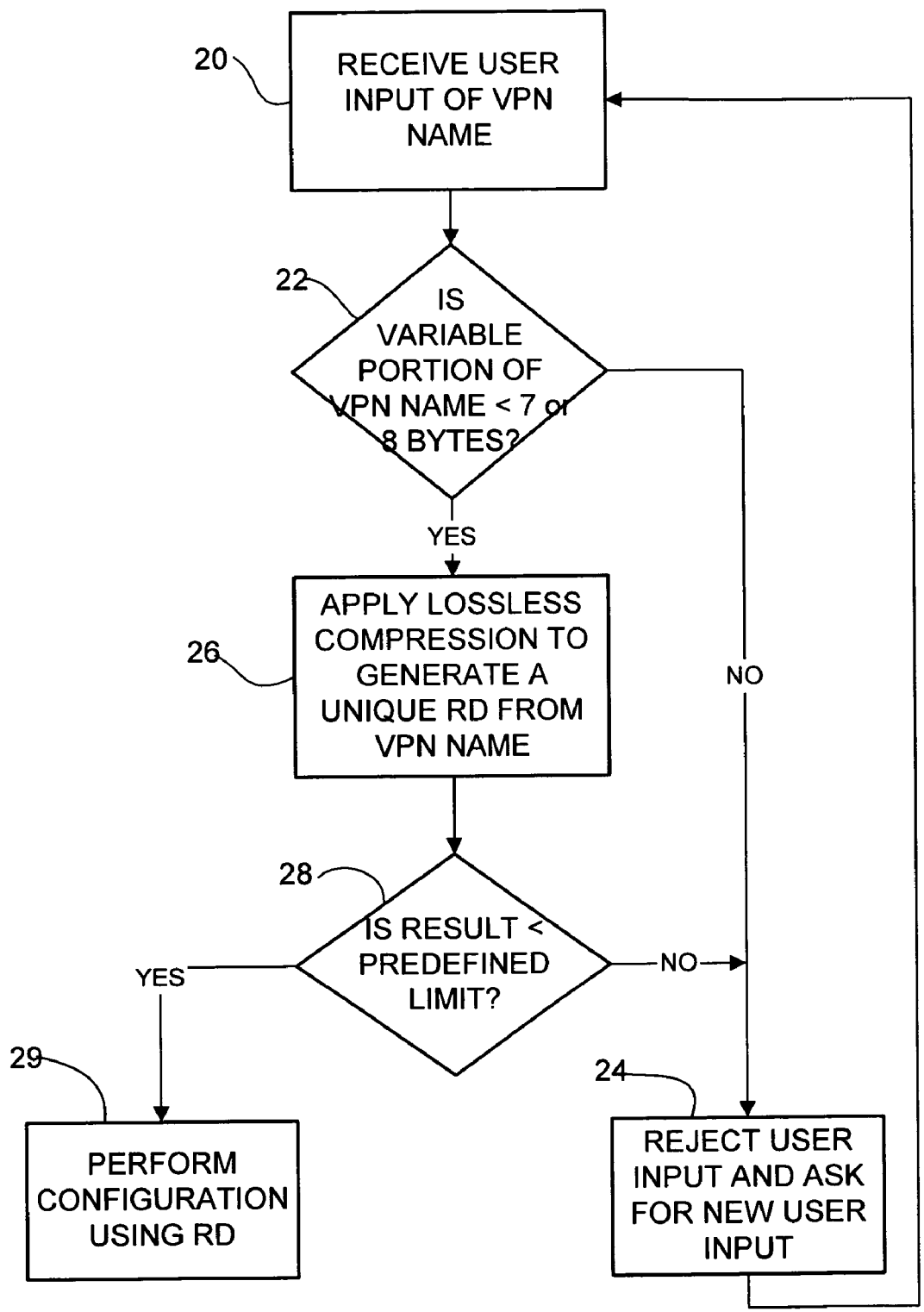
FIG. 2 is a flowchart illustrating a process of a first embodiment of the present invention for automatic generation of route distinguishers for VPNs.

FIG. 2 is a flowchart illustrating a process of the first embodiment of the present invention for generating a route distinguisher. At step 20 user input of a VPN name is received. The VPN name is checked to see if the variable portion of the VPN name is less than 7 or 8 bytes (entire VPN name less than or equal to 10 bytes) (step 22). If it does not meet this requirement, the user input is rejected and new input is requested (steps 22 and 24). If the VPN name is accepted, a lossless compression algorithm is applied to generate a unique RD from the VPN name (step 26). If the resulting RD is sufficiently small, the generated RD is used (steps 28 and 29). If the generated RD is too large, the user input is rejected and the new input is requested (steps 28 and 24).

A second embodiment of the present invention avoids the large output problem discussed above, at the cost of further restricting the VPN name. The input is restricted to start with the predefined prefix (e.g., VPNxxxxxxx as described above). The input is also restricted to include only the letters of the English alphabet, digits 0-9, and some other two characters/delineators, e.g., ":" and "-" (or any other two symbols). In addition, the input is made case-insensitive.

These restrictions reduce the possible input alphabet to 26 letters+2symbols+10 digits; resulting in a total of 38 distinct characters. This assumes pre-processing to convert any upper-case letters to lower-case letters or vise-versa. The 7 character variable portion of the VPN name input is reduced to a 7 letter word in a 38 character alphabet. Treating this word as a number base 38, it can then be uniquely converted to a binary number. A 7 digit number base 38 is smaller than $38^7$, which in turn is smaller than $2^48$. Therefore 48 bits (6 bytes) should be sufficient to encode the input word uniquely as a binary number.

Figure 3:
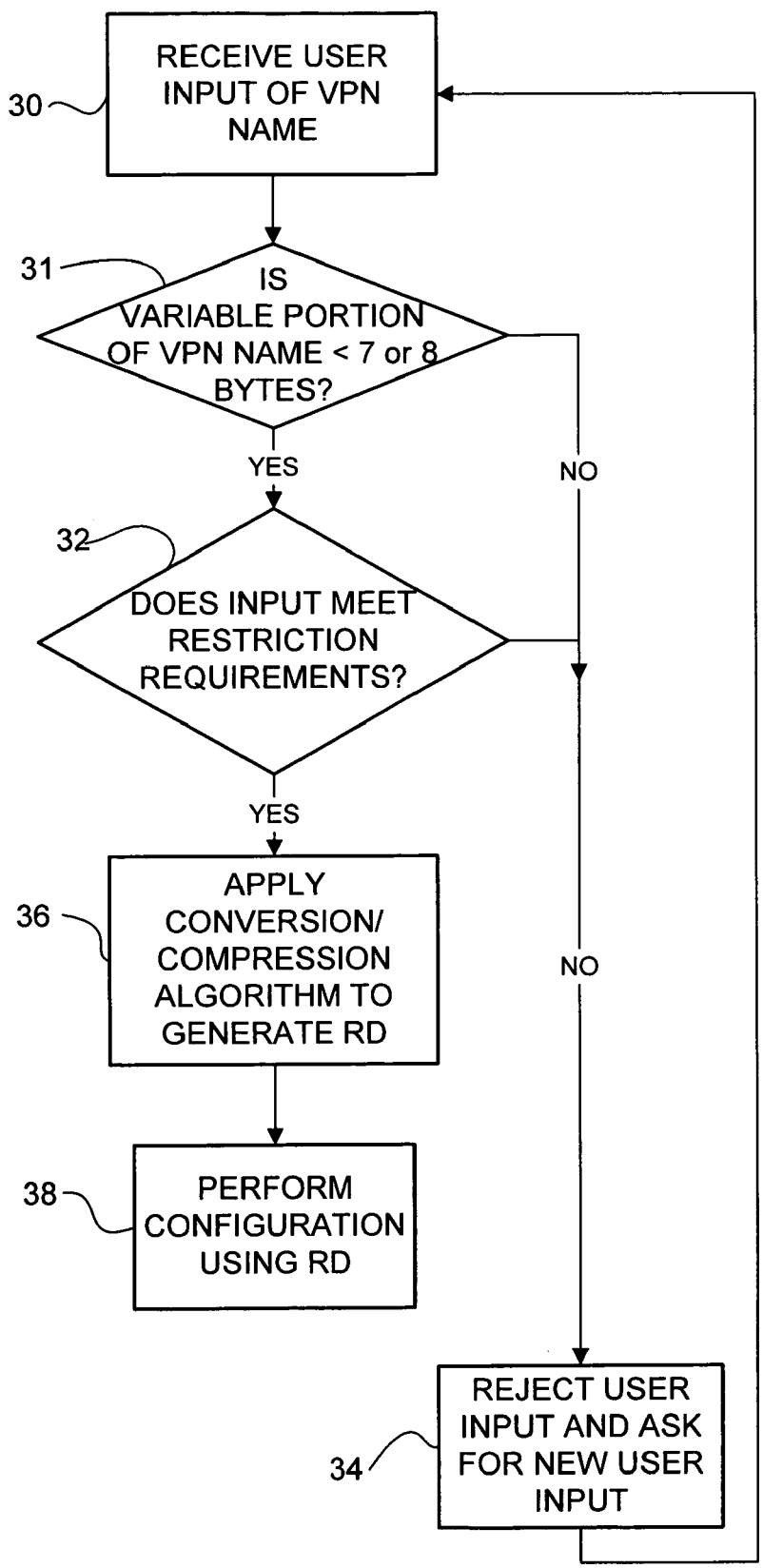
FIG. 3 is a flowchart illustrating a process of a second embodiment of the present invention for automatic generation of route distinguishers for VPNs.

FIG. 3 is a flowchart illustrating a process of the second embodiment for generating route distinguishers. User input for VPN name is received at step 30. The VPN name is checked to see if the variable portion of the VPN name is between 7 and 8 bytes (entire VPN name less than or equal to 10 bytes) (step 31). If it does not meet this requirement, the user input is rejected and new input is requested (steps 31 and 34). Also, the input is checked to make sure that it meets the character restriction requirements. If the input does not meet restriction requirements (e.g., includes characters which are not allowed for input), the user input is rejected and new input is requested (steps 32 and 34). If all character restrictions are satisfied, a conversion or compression algorithm is applied and the generated RD is used (steps 36 and 38).

Figure 4:
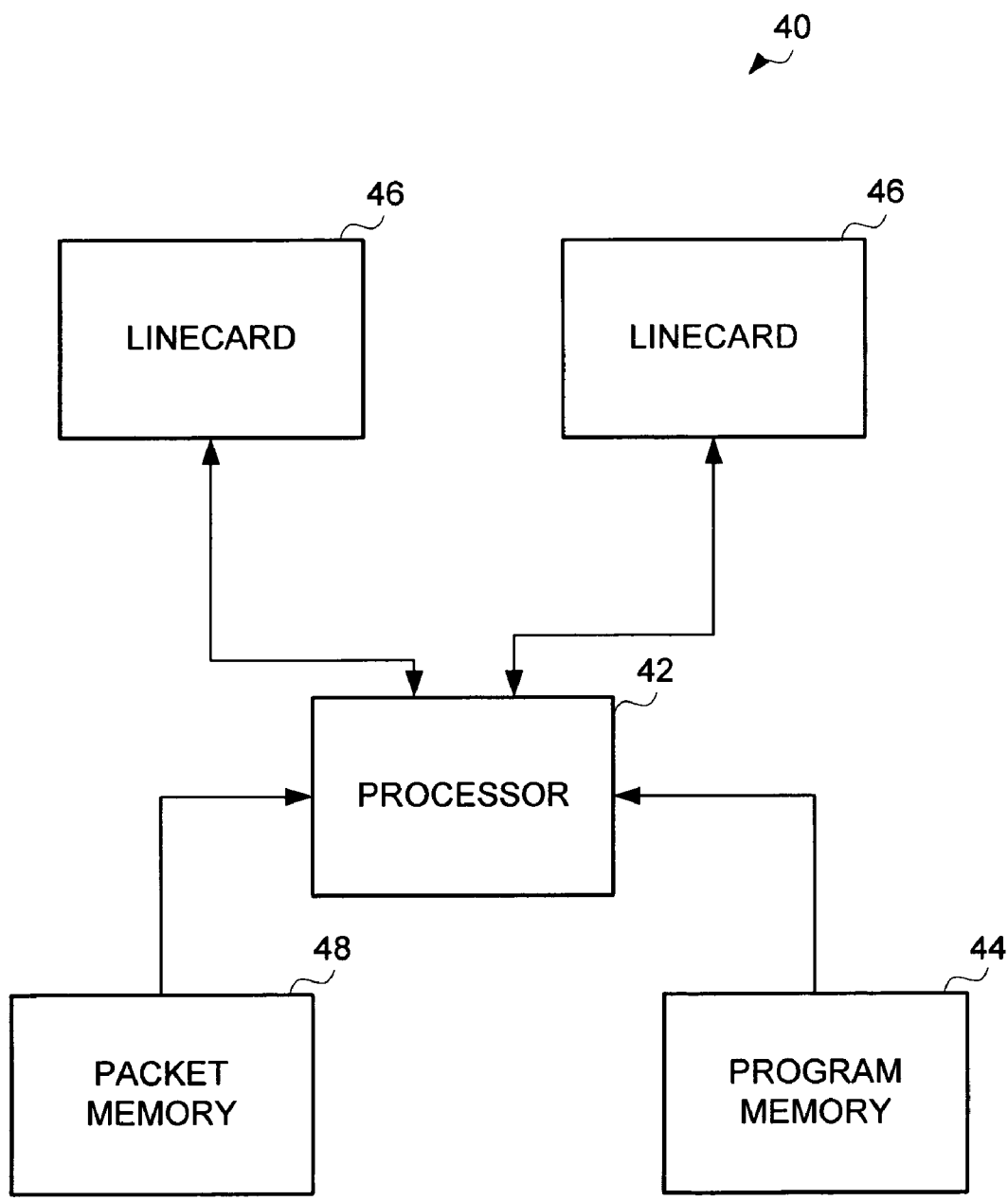
FIG. 4 depicts a network device useful in implementing embodiments of the present invention.

FIG. 4 depicts a network device 40 that may be used to implement the method and system described above. In one embodiment, network device 40 is a programmable machine that may be implemented in hardware, software, or any combination thereof. A processor 42 executes code stored in a program memory 44. Program memory 44 is one example of a computer-readable medium. Program memory 44 can be a volatile memory. Another form of computer-readable medium storing the same codes may be some type of non-volatile storage such as floppy disks, CD-ROMs, DVD-ROMs, hard disks, flash memory, etc.

Network device 40 interfaces with physical media via a plurality of linecards 46. As packets are received, processed, and forwarded by network device 40, they may be stored in a packet memory 48. Packet transmission operations may occur partially or completely within one of the linecards 46. To implement functionality according to the present invention, linecards 46 may incorporate processing and memory resources similar to those discussed above in connection with the network device as a whole. Network device 40 implements all of the features provided by the present invention.

Network device 40 shown in FIG. 4 is only one example of a computer system suitable for use with the invention. Other devices and systems having different configurations of subsystems may also be utilized. Communication between computers within the network is made possible with the use of communication protocols, which govern how computers exchange information over a network.

As can be observed from the foregoing, the system and method described herein provide many advantages. For example, by allowing autogeneration of route distinguishers from the VPN name, accurate configuration can be accomplished in one easy step. Furthermore, the present invention allows decisions to be made locally and eliminates the need for a centralized registry.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method comprising:
receiving at a network device, a virtual private network name;
determining if said received virtual private network name meets a predefined requirement, wherein said predefined requirement defines virtual private network names that can be converted into a specified output comprising a unique route distinguisher identifier;
if said received virtual private network name does not meet said predefined requirement, rejecting said virtual private network name and requesting a new virtual private network name;
if said received virtual private network name meets said predefined requirement, automatically generating a route distinguisher from said virtual private network name, wherein automatically generating comprises applying an algorithm at a processor at the network device to automatically convert said virtual private network name into said unique route distinguisher identifier and adding an autonomous system number to said identifier to create said route distinguisher for a virtual private network; and
utilizing said route distinguisher to build a full mesh virtual private network;
wherein said virtual private network name is rejected if the size of the route distinguisher identifier is greater than a predefined limit.

2. The method of claim 1 wherein said predefined requirement comprises a requirement that said virtual private network name is less than or equal to ten bytes.

3. The method of claim 1 wherein applying an algorithm to convert said virtual private network name to a route distinguisher comprises applying a compression algorithm.

4. The method of claim 3 wherein the compression algorithm is a lossless compression algorithm.

5. The method of claim 1 wherein said predefined limit is six bytes.

6. The method of claim 1 wherein said unique route distinguisher identifier comprises six bytes and said autonomous system number comprises two bytes.

7. The method of claim 1 wherein said predefined requirement comprises restriction of said virtual private network name to a group of symbols and wherein said virtual private network name is rejected if the virtual private network name contains symbols which are not in the group.

8. The method of claim 7 wherein said group of symbols comprises letters of the alphabet and digits between and including zero and nine.

9. A method comprising
assigning at a network device, a route distinguisher to a virtual private network, comprising:
receiving user input;
determining if said received user input meets a predefined requirement, wherein said predefined requirement defines virtual private network names that can be converted into a specified output comprising a unique route distinguisher identifier;
if said received user input does not meet said predefined requirement, rejecting said user input and requesting new user input; and
if said user input is not rejected, applying an algorithm to automatically convert said user input to a unique route distinguisher for the virtual private network, wherein said route distinguisher comprises said unique route distinguisher identifier and an autonomous system number; and
building a full mesh virtual private network at a processor of the network device;
wherein said predefined requirement comprises a requirement that said user input is less than or equal to ten bytes.

10. The method of claim 9 wherein building a full mesh virtual private network comprises utilizing a configuration that contains only one line on a virtual private network routing/forwarding instance.

11. The method of claim 9 wherein applying an algorithm to convert said user input to a route distinguisher comprises applying a compression algorithm.

12. The method of claim 11 wherein the compression algorithm is a lossless compression algorithm.

13. The method of claim 9 further comprising rejecting said user input if said route distinguisher identifier is greater than a predefined limit.

14. The method of claim 9 wherein said predefined requirement includes restriction of said user input to a group of symbols and wherein said user input is rejected if the user input contains symbols which are not in the group.

15. A non-transitory computer-readable storage medium encoded with a computer program for automatically generating a route distinguisher for a virtual private network, the computer program comprising:
    code that determines if a received virtual private network name meets a predefined requirement, wherein said predefined requirement defines virtual private network names that can be converted into a specified output comprising a unique route distinguisher identifier;
    code that causes said received virtual private network name to be rejected if said virtual private network name does not meet said predefined requirement, and request a new virtual private network name;
    code that causes an algorithm to automatically convert said virtual private network name into said unique route distinguisher identifier and add an autonomous system number to create said route distinguisher for the virtual private network, if said virtual private network name meets said predefined requirement;
    code that utilizes said route distinguisher to build a full mesh virtual private network; and
    code that causes said received virtual private network name to be rejected if the size of the route distinguisher identifier is greater than a predefined limit.

16. The non-transitory computer-readable storage medium of claim 15 wherein the algorithm is a lossless compression algorithm.

17. The non-transitory computer-readable storage medium of claim 15 wherein said predefined requirement comprises restriction of said virtual private network name to a group of symbols, and wherein said code rejects said name if the name contains symbols which are not in the group.

18. Apparatus for automatically generating a route distinguisher for a virtual private network, the apparatus comprising:
    means for determining if a received virtual private network name meets a predefined requirement, wherein said predefined requirement defines said virtual private network names that can be converted into a specified output comprising a unique route distinguisher identifier;
    means for rejecting said virtual private network name if said virtual private network name does not meet said predefined requirement, and requesting a new virtual private network name;
    means for applying an algorithm to automatically convert said virtual private network name into said unique route distinguisher identifier and adding an autonomous system number to said identifier to create said route distinguisher for the virtual private network, if said virtual private network name meets said predefined requirement; and
    means for utilizing said route distinguisher to build a full mesh virtual private network;
    wherein said predefined requirement comprises a requirement that said virtual private network name is less than or equal to ten bytes.

19. The apparatus of claim 18 wherein said algorithm comprises a compression algorithm.

20. The apparatus of claim 18 wherein said predefined requirement comprises restriction of said virtual private network name to a group of symbols and wherein said virtual private network name is rejected if the virtual private network name contains symbols which are not in the group.

* * * * *